United States Patent [19]

Camerman

[11] 3,923,909
[45] Dec. 2, 1975

[54] OXIDATION OF DIETHYLBENZENES
[75] Inventor: Philippe Jean Andre Camerman, Wezembeek-Oppem, Belgium
[73] Assignee: Labofina S.A., Brussels, Belgium
[22] Filed: Feb. 20, 1973
[21] Appl. No.: 334,084

[30] Foreign Application Priority Data
Oct. 4, 1972  Belgium.................................. 122730

[52] U.S. Cl. .......................... 260/624 R; 260/610 B
[51] Int. Cl.²............................................. C07C 39/02
[58] Field of Search ........ 260/610 B, 621 C, 624 R, 260/621 R, 604 R, 604

[56] References Cited
UNITED STATES PATENTS
| | | | |
|---|---|---|---|
| 2,661,375 | 12/1953 | Conner................. | 260/601 |
| 2,671,809 | 3/1954 | Fortuin et al........... | 260/593 |
| 3,497,561 | 2/1970 | Gelbein................. | 260/606 |

FOREIGN PATENTS OR APPLICATIONS
| | | | |
|---|---|---|---|
| 602,907 | 8/1960 | Canada................... | 260/621 C |

*Primary Examiner*—Bernard Helfin
*Assistant Examiner*—W. B. Lone
*Attorney, Agent, or Firm*—Bacon & Thomas

[57] ABSTRACT

A process for producing ethylphenols which comprises (1) the oxidation of diethylbenzene by passing a molecular oxygen containing gas into contact with said diethylbenzene at a temperature between 100° and 180°C to convert 5 to 30 percent of said diethylbenzene into diethylbenzene hydroperoxide, (2) withdrawing the reaction mixture, separating the unconverted diethylbenzene therefrom to obtain a hydroperoxide concentrate containing at least 40 percent of diethylbenzene hydroperoxide, (3) mixing the diethylbenzene hydroperoxide concentrate with a solvent selected from the group consisting of low molecular weight aliphatic alcohols, ketones and mixtures thereof, (4) decomposing said hydroperoxide by intimate contact with a strong acid which is used in an amount of between 0.05 and 5 percent of the weight of total reaction mixture, and neutralizing the resulting mixture, and (5) distilling the neutralized mixture to recover a bottom fraction containing ethylphenol and a top fraction containing acetaldehyde.

14 Claims, No Drawings

OXIDATION OF DIETHYLBENZENES

BACKGROUND OF THE INVENTION

The present invention relates to a process for producing ethylphenols and acetaldehyde. More particularly, the present invention relates to a process for producing ethylphenols and acetaldehyde via the liquid phase oxidation of diethylbenzenes.

Ethylphenols are used for the production of many valuable derivatives which are employed for example, as additives for lubricating oils, as stabilizers for rubber, synthetic resins, oils, etc. Moreover, difficulty in obtaining cresols has resulted in an increasing demand for substitutes such as ethylphenols.

Generally ethylphenols have been prepared by alkylating phenol. While such methods are satisfactory in some respects, there are several disadvantages. Excessive amounts of poly-alkylated by-products are formed and the mixture of o-, m- and p-ethylphenols is produced. It is then difficult to obtain each isomer in a pure form since meta and para isomers boil at the same temperature. Further, such known processes are not convenient for the direct production of meta-ethylphenol since the mixture of ethylphenols obtained contains primarily the ortho and para isomers which must be isomerized into meta ethylphenol if such is desired. In such instance, however, the ethylphenol purity will be low. These disadvantages make desirable the finding of new and improved routes for the commercial production of ethylphenols.

An object of the present invention is to provide a process for the production of ethylphenols from diethylbenzenes.

A further object of the present invention is to provide a process for the production of the specific isomers of ethylphenol.

Another object of the present invention is to provide a new process for the production of ethylphenols and acetaldehyde from diethylbenzenes.

A further object of the present invention is to provide a process for the production of m-ethylphenol and acetaldehyde from m-diethylbenzene.

Additional objects will become apparent from the following description of the invention herein disclosed.

SUMMARY OF THE INVENTION

According to the present invention, ethylphenol and acetaldehyde are produced by a process which comprises:

a. reacting in liquid phase, diethylbenzene with a molecular oxygen containing gas at a temperature between 100° and 180°C until 5 to 30 percent of the diethylbenzene feed is converted into diethylbenzene hydroperoxide, b. withdrawing the reaction mixture, separating the unconverted diethylbenzene therefrom to obtain a concentrate containing at least 40 percent of diethylbenzene hydroperoxide, c. mixing the diethylbenzene hydroperoxide concentrate with a solvent selected from the group consisting of the low molecular weight aliphatic alcohols, ketones and mixtures thereof, d. decomposing said hydroperoxide by intimate contact with a strong acid which is used in an amount of between 0.05 and 5 percent of the weight of total reaction mixture and thereafter neutralizing the resulting mixture, e. distilling the neutralized mixture to recover a bottom fraction containing ethylphenol and an overhead fraction containing acetaldehyde.

DESCRIPTION OF PREFERRED EMBODIMENTS

The feed to the process of the present invention is a diethylbenzene feed. A mixture of the isomers of diethylbenzenes are readily available from most alkylation processes used for the alkylation of benzene with ethylene to produce ethylbenzene. The ever increasing demand for styrene has resulted in an increase in the production of ethylbenzene which in turn has resulted in an increase in the availability of diethylbenzenes. If desired to produce specific ethylphenol isomers by the process of the present invention, the diethylbenzene feed may be subjected to distillation by means of which the meta- isomer may be readily obtained. The meta-diethylbenzene may then be converted to the meta-ethylphenol. The ortho-, para- mixture remaining from any such distillation may be subjected to oxidation in accordance with the process of the present invention and the resulting ortho- and para- ethylphenols can be separated by distillation to produce each isomer. Thus, the feed to the process of the present invention may be a mixture of diethylbenzene isomers or either of the isomers alone. In a particularly useful embodiment of the present invention, the feed consists of meta-diethylbenzene to produce meta-ethylphenol.

In order to obtain high selectivity in hydroperoxide the diethylbenzene must be of good purity and in particular, the diethylbenzene should be free from acids and arylvinyl compounds. Also, in the event unreacted diethylbenzene is recycled, it is preferred to avoid a concentration of diethylbenzene oxidation products, other than hydroperoxides, higher than about 0.5 percent in the diethylbenzene feed. Most of the unconverted diethylbenzene recovered from the process of the present invention may be recycled without purification. However, in some instances, the recycle diethylbenzene may contain formic acid and ethylstyrene. These contaminants preferably are removed before the diethylbenzene is recycled.

The oxidation reaction of the diethylbenzene feed in accordance with the first step of the present invention is carried out at a temperature which may vary from 100° to 180°C. The oxidation rate of diethylbenzene increases as the reaction temperature is increased and, in order to minimize equipment sizes, it is desirable to carry out the reaction at the higher temperatures. However, the rates of formation of undesirable oxygenated by-products are also increased, as the reaction temperature is increased. Consequently, the reaction temperature during the oxidation step of the present process is generally maintained between about 125° and 160°C and more particularly, between 130° and 150°C. According to a preferred embodiment of this invention, the oxidation is carried out by starting the reaction at about 150°C and then progressively decreasing the temperature down to about 140°C.

The oxidizing agent may be air, oxygen or other molecular oxygen containing gas. Air has the advantage of a lower cost but oxygen permits higher throughput per unit reactor volume. However, the choice of the molecular oxygen containing gas depends primarily on economic conditions. The oxidation reaction is carried out by passing the molecular oxygen containing gas into liquid diethylbenzene under conditions insuring a rapid and intimate contact between the two phases, for example by using a bubble-column or a reactor with a stirring device. In order to avoid an excessive formation of undesirable by-products, more particularly of acid compounds which catalyze the decomposition of the formed hydroperoxide, it is desirable to use the oxygen containing gas in controlled amounts. A large excess of said gas is detrimental with respect to the selectivity of the process. For this reason, the amount of oxygen in the vent gas is kept preferably below 20 percent and more particularly below 10 percent.

The oxidation reaction may be carried out at atmospheric pressure or at somewhat higher pressures. However, it has been found that pressures higher than 10 atm. do not result in improved yields. Therefore, generally, pressures lower than 10 atm. are employed.

The oxidation reaction proceeds according to a chain mechanism with free radicals as chain propagators. Therefore, it may be desirable to initiate this mechanism by means other than thermal self-initiation. Suitable initiators include peroxycompounds, such as perbenzoates, tert-butylperoxide, diethylbenzene hydroperoxides, and diazo compounds, such as azobiscyclohexanenitrile, which are soluble in the feed and which decompose at the reaction temperature to produce initiating radicals. An initiator is advantageously employed not only to reduce the induction period at the beginning of the reaction but also to maintain a high rate of initiation i.e. high rate of oxidation, throughout the course of the reaction. The amount of initiator employed depends largely on its efficiency at the chosen temperature but generally does not exceed 5 percent by weight based on the feed. At temperatures higher than 135°C, the thermal self-initiation is sufficiently rapid without addition of an initiator.

By-products are formed during the oxidation of diethylbenzene into the corresponding hydroperoxide and some of these byproducts, namely the acid compounds, tend to decompose the hydroperoxide. In order to minimize this undesirable happening, it may be advisable to add basic substances to the reaction mixture. Suitable basic compounds are carbonates of alkaline and alkaline-earth metals, oxides of alkaline-earth metals such as calcium oxide, sodium or potassium soaps such as stearate, pyridine and their mixtures. These basic substances are used in amounts which may vary within large limits, generally between 0.1 and 5 percent and more particularly, between about 0.5 and 2 percent by weight based on the feed material. The optimum amount of basic substance added will depend on the neutralizing efficiency of the basic substance and on the composition of the oxidizing gas and is readily determined by those skilled in the act.

The selectivity of the present process for the production of the diethylbenzene monohydroperoxide depends on the reaction conditions, the feed purity, the presence of initiators and also to a large extent, on the degree of the conversion. The effect of degree of conversion is due partly to the detrimental effect of the by-products obtained by the thermal decomposition of the hydroperoxides which accumulate progressively. Also, such effect results from the fact that the diethylbenzene monohydroperoxide is oxidized to an increasing extent into other hydroperoxidic compounds and mainly to bishydroperoxide and acetyl-ethylbenzene hydroperoxide. Therefore, it is preferable to limit the diethylbenzene conversion. It has been found that the most useful conversions lie between 5 and 30 percent, and more particularly, between about 10 and 25 percent.

The effects of the degree of conversion of the feed on the selectivity of hydroperoxide formation and the interdependence of the operating conditions of the present process are shown by the following results of comparative experiments obtained by oxidizing m-diethylbenzene in batch operation. The data of Tables I and II refer to oxidation reactions carried out at a temperature of about 130°C.

In a first series of experiments, m-diethylbenzene (m-DEB) was oxidized in the presence of 1 percent by weight of solid $Na_2CO_3$ (based on the m-DEB). The oxidizing gas, pressure, reaction time and the initiator employed are set forth in Table 1. These experiments were carried out in a glass reactor, except experiment 4, where stainless steel was used. The initiators were added at the beginning of the reaction except for azobiscyclohexanitrile (ADCN) which was added in portions through the reaction. The results are presented in Table I.

Table I

| Experiment | 1 | 2 | 3 | 4 | 5 | 6 |
|---|---|---|---|---|---|---|
| Initiator | — | DEBOOH* | tert-butyl-peroxide | tert-butyl-peroxide | tert-butyl-perbenzoate | ADCN |
| weight % | — | 2 | 2 | 2 | 1 | 1.4 |
| Oxidizing gas (wet) | $O_2$ | $O_2$ | $O_2$ | air | $O_2$ | $O_2$ |
| Pressure (atm.) | 1 | 1 | 1 | 6 | 1 | 1 |
| Reaction time (min) | 190 | 190 | 168 | 170 | 185 | 155 |
| DEB conversion (%) | 8.6 | 12.3 | 24.3 | 23.6 | 26.3 | 25.0 |
| Selectivity for: -total hydroperoxides (%) | 89.0 | 87.6 | 79.6 | 82.2 | 73.2 | 79.4 |
| -m-DEBOOH (%) | 85.6 | 84.4 | 74.5 | 75.7 | 68.5 | 73.8 |

*DEBOOH = diethylbenzene monohydroperoxide

The date of Table I above shows the advantage of using an initiator not only to avoid the induction period at the beginning of the reaction, but also to ensure a higher reaction rate than that obtained with the diethylbenzene hydroperoxide as the sole source of radicals. The results of experiments 3 and 4 show also that practically equivalent results with respect to conversion and selectivity, are obtained by using either oxygen at atmospheric pressure or air at higher pressure, under the same conditions.

Further experiments were carried out to illustrate the influence of basic compounds added to the reaction mixture. In these experiments, the basic compounds were added at the beginning of the reactions. The reactions were performed in glass reactors with oxygen (wetted when $Na_2CO_3$ were used) at atmospheric pressure. These experiments are summarized in Table II.

Table II

| Experiments | 7 | 8 | 9 | 10 | 11 | 12 | 13 |
|---|---|---|---|---|---|---|---|
| Initiator | DEBOOH* | | | tert-Butylperoxide | | | |
| weight % | 2 | 2 | 2 | 2 | 2 | 2 | 2 |
| Basic additive | — | $Na_2CO_3$ | — | $Na_2CO_3$ | CaO | Na | Pyridine |

Table II-continued

| Experiments | 7 | 8 | 9 | 10 | 11 | 12 | 13 |
|---|---|---|---|---|---|---|---|
| | | | | | | Stearate | |
| weight % | — | 1 | — | 1 | 0.5 | 0.2 | 1 |
| Reaction time (min) | 240 | 190 | 190 | 168 | 190 | 175 | 190 |
| m-DEB conversion (%) | 13.7 | 12.3 | 24.6 | 24.3 | 24.3 | 26.1 | 20.4 |
| Selectivity for: | | | | | | | |
| -total hydroperoxides (%) | 83.0 | 87.6 | 73.0 | 79.6 | 79.4 | 77.0 | 78.0 |
| -m-DEBOOH (%) | 79.9 | 84.4 | 67.9 | 74.5 | 73.8 | 71.6 | 72.5 |

*DEBOOH = diethylbenzene monohydroperoxide

The experiment summarized in Table II illustrate the advantages of adding to the reaction mixture, a basic compound. From Table II, it may be seen that the basic compound may be soluble or insoluble. The choice of the basic additives is dictated mainly by economic considerations and, as indicated hereinabove, other alkaline or alkaline-earth oxides, carbonates, etc. may be used.

To demonstrate the effect of temperature, experiments were carried out at temperatures above 130°C. These experiments were carried out at atmospheric pressure in a glass reactor. The initiator was added at the beginning of the reaction and the oxidizing gas was wetted when $Na_2CO_3$ was used. The remaining conditions of the experiments and the results are presented in Table III below.

type and amount of activator, reaction temperature and reaction time are interdependent. In a preferred practice of the present invention, diethylbenzene is oxidized at atmospheric pressure and at a temperature in the range of about 150°-140°C with no external initiator being added. In such preferred practice, the air flow rate is adjusted in such a way that the oxygen percentage in the vent gas remains below 10 percent by volume.

After the oxidation step of the process of the present invention, the oxygenated products are concentrated by removing the bulk of the unreacted diethylbenzene by vacuum distillation. In a useful embodiment of the present invention, this distillation is carried out at a temperature of about 40° to 75°C under a vacuum in the range of 2 to 5 mm Hg. The remaining mixture or Table III

| Experiment | 14 | 15 | 16 | 17 | 18 | 19 | 20 |
|---|---|---|---|---|---|---|---|
| Temperature (°C) | | | 140 | | | 150–140 | 160–150 |
| Initiator | | DEBOOH* | | no | | no | no |
| weight % | | 2 | | | | — | — |
| Oxidizing gas | $O_2$ | air | air | air | air | air | air |
| Liter/hour/liter | 60 | 113 | 121 | 170 | 108 | 148 | 245 |
| Basic additive | no | $Na_2CO_3$ | no | — | no | no | no |
| weight % | — | 1 | — | — | — | | |
| Reaction time (minute) | 170 | 162 | 170 | 170 | 190 | 125 | 75 |
| Average $O_2$% in the vent gas after induction period | 100 | 10 | 12 | 14 | 9 | 10 | 10 |
| DEB conversion (%) | 23.0 | 23.4 | 22.5 | 23.5 | 23.8 | 22.0 | 24.6 |
| Selectivities for: | | | | | | | |
| -total hydroperoxides | 81.0 | 82.2 | 84.5 | 83.5 | 86.0 | 85.0 | 75.0 |
| -DEBOOH | 75.3 | 77.0 | 78.7 | 77.5 | 80.0 | 80.2 | 69.0 |

*DEBOOH = diethylbenzene monohydroperoxide

From Table III, it is seen that reasonable reaction rates can be obtained without addition of an initiator at the higher temperatures. Also, it is seen that the use of a basic additive becomes less critical and even unnecessary at the higher temperatures.

From Tables I, II and III, it is seen that the oxidizing gas may be pure oxygen or air at atmospheric or higher pressures. It is noted, however, that the use of air instead of pure oxygen affords a better selectivity for hydroperoxide formation. Still better selectivity is obtained when the air flow rate is adjusted in such a way that the average oxygen percentage in the vent gas remains below 10 percent (see experiments 17 and 18 of Table III). Further, from the experiments of Tables I, II and III, it is seen that the operating variables, namely concentrate of oxygenated products, should contain at least 50 percent by weight of hydroperoxides. However, the concentration may be continued up to about 80 percent by weight, the maximum content of hydroperoxides in this concentrate depending upon the selectivity of the oxydation step. The diethylbenzene removed by the vacuum distillation, which usually contains small amounts of oxygenated compounds, such as diethylbenzenemonohydroperoxides, ethylacetophenone and methyl (ethylphenyl) carbinol. may be directly recycled to the first step of the present process.

Following recovery of the hydroperoxide concentrate, the concentrate is decomposed in order to obtain ethylphenol and acetaldehyde according to the reaction

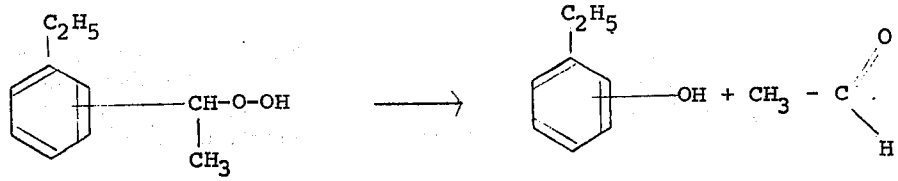

This decomposition proceeds rapidly when the concentrate of oxygenated products is brought into intimate contact with an acid. Any strong acid which does not interfere with the reaction may be used as catalyst for this decomposition. By way of example, sulfuric acid, phosphoric acid, sulfonic acids, Lewis acids and acid ion-exchange resins may be used. The choice of the acid largely depends upon economic conditions, namely price and ease of removal from the decomposition products. In a preferred embodiment of the process, sulfuric acid is used as catalyst.

Different methods may be used to carry out the decomposition step of the present invention. The decomposition is exothermic and requires temperature control by removal of the heat of reaction. One method of carrying out this step comprises the use of aqueous sulfuric acid, the concentrate of oxygenated products being added rapidly to this aqueous sulfuric acid heated to about 95°–100°C. In other methods, concentrated sulfuric acid is used as catalyst in the presence of a solvent selected from lower alkanones, such as acetone, lower alkanols, such as methanol, or acetic acid, at a temperature of about 55°–75°C. In this method, a stream of nitrogen is introduced in order to distill off acetaldehyde. Comparative experiments have shown that best results are obtained by working in the presence of anhydrous acetone, either by adding the concentrate in a large volume of boiling acetone containing concentrated sulfuric acid or by treating in a smaller volume of boiling acetone containing concentrated sulfuric acid, some acetone being continuously distilled together when acetaldehyde, and replaced by fresh acetone. The molar yield of ethylphenol and acetaldehyde reaches 85 percent to 95 percent in both of the latter methods.

Table IV illustrates the results obtained by working as described hereinabove. Experiments were carried out by adding the concentrate of diethylbenzene hydroperoxide over a period of about 20 minutes to the solvent containing the acid catalyst. These reactions carried out in acetic acid and water were performed under a stream of nitrogen. Other variables and results are presented in Table IV.

Table IV

| Solvent | Acetone | Acetone | Acetone | Methyl alcohol | Acetic acid | Water |
|---|---|---|---|---|---|---|
| Solvent/hydroperoxide vol. ratio in the reactor | 4.0 | 2.0 | 0.8 | 4.0 | 1.0 | 1.4 |
| % of solvent distilled during the reaction | no | 10 | 100 | no | no | no |
| % of solvent replaced | no | no | 100 | no | no | no |
| Catalyst (98% $H_2SO_4$): weight per 100 volumes of reaction mixture | 0.25 | 0.27 | 0.25 | 0.55 | 0.10 | 0.00 |
| Reaction temp. (°C) | At the reflux of the solvent | | | | | |
| Reaction time(min) | 45 | 50 | 120 | 130 | 120 | 90 |
| Yield of ethylphenol (% of thorical) | 92 | 86 | 90 | 61 | 47 | 51 |
| Yield of acetaldehyde (% of thorical) | 86 | — | 81 | not determined | | |

The resulting decomposition mixture contained not only ethylphenol and acetaldehyde, but also other oxidation products of diethylbenzene, sulfuric acid, acetone and a number of impurities. This mixture is first freed from sulfuric acid by neutralization with an aqueous solution of an alkaline compound, such as sodium hydroxide or sodium carbonate, and by filtration of the precipitated sulfate. The next step comprises distillation of the acid-free mixture at a temperature between 56° and 100°C. The top fraction contains acetaldehyde together with acetone and water. The bottom fraction contains ethylphenol, some diethylbenzene and other oxidation products of diethylbenzene. The recovery of the ethylphenol in a pure form is carried out either by direct fractional distillation or by extraction. The extraction is with an aqueous solution of sodium hydroxide followed by a washing of the alkaline extract with heptane, benzene or other similar solvent, reacidification of the aqueous extract with sulphuric acid, recovery of the purified ethylphenols and distillation thereof. The unconverted diethylbenzene obtained by either distillation or extraction may be recycled to the first step of the process provided it is substantially free from ethylstyrene and oxygenated products. Ethylstyrene may be removed by such methods as mild hydrogenation of the diethylbenzene before recycling.

In the preferred practice of the present invention, that of converting m-diethylbenzene into m-ethylphenol, the mixture resulting from the acid decomposition of the hydroperoxides is fractionated by distillation under moderate vacuum, for example 40 mm Hg. At this pressure, m-ethylphenol boils 37°C higher than m-diethylbenzene and 10°C lower than m-ethylacetophenone. It may be recovered with a good purity (about 98 percent) with a molar yield of 85 to 90 percent based on the m-diethylbenzene hydroperoxide.

The features and other characteristics of the process of the present invention will be further described by the following non-limiting example.

EXAMPLE

Redistilled meta-diethylbenzene (233 ml.) charged to a glass reactor equipped with a stirring device, a cooling system and a Dean and Stark condenser. Air was bubbled into the liquid with agitation at a rate of 34 liter per hour. The reaction mass was then heated to 150°C at which temperature oxygen uptake began rapidly. After about 20 minutes the oxygen percentage in the vent gas was depressed to about 9 to 10 percent and remained at this value throughout the course of the reaction. The temperature was progressively decreased as the diethylbenzene conversion increased in such a way that 140°C was reached when 22 percent conversion was obtained as determined by oxygen absorption measurements. This conversion was obtained after 125 minutes and the reaction mixture was then rapidly cooled to 30°–40°C and collected.

During the reaction some diethylbenzene (about 1 percent of the charged hydrocarbon) was collected in the Dean and Stark condenser together with small amounts of water and formic acid. This diethylbenzene could be recycled to the oxidation reaction after washing with water or with an aqueous solution of $Na_2CO_3$.

Upon analysis of the reaction mixture, it was found that the diethylbenzene hydroperoxide (DEBOOH) and the total hydroperoxides accounted respectively, for 80 percent and 85 percent in mole of the converted diethylbenzene. The relative molar and weight composition of the mixture are given below.

|  | mole % | weight % |
|---|---|---|
| Diethylbenzene | 78.0 | 74.1 |
| Diethylbenzene hydroperoxide | 17.7 | 20.8 |
| Acetylethylbenzene hydroperoxide | 0.2 | 0.3 |
| bis-Diethylbenzene hydroperoxide | 0.9 | 1.3 |
| Ethylacetophenone | 2.0 | 2.1 |
| Methyl(ethylphenyl) carbinol | 1.0 | 1.1 |
| Rest | 0.2 | 0.3 |

The hydroperoxides were concentrated to 72 wt. percent by distilling off most of the unconverted hydrocarbon at 50°C under 2 mm Hg in a rotative evaporator. The distillate consisted of 99.2 wt. percent diethylbenzene, 0.2 wt. percent ethylacetophenone, 0.6 wt. percent of diethylbenzene hydroperoxide (DEBOOH) and traces of methyl(ethylphenyl) carbinol. This distillate may be recycled to further oxidation.

The bottoms concentrate (65 gr) contained 291 meq of hydroperoxide functions and 259 moles of diethylbenzene hydroperoxide (DEBOOH) (43.1 gr). It was diluted with 33 ml. of acetone and the mixture introduced during a 15 minute period into 230 ml of boiling acetone containing 0.8 g of 98 percent $H_2SO_4$. The solution was thoroughly mixed and maintained at reflux for an additional 35 minutes. At this time 98 to 99 percent of the hydroperoxide was decomposed.

After the cooling to 25°C, the solution was neutralized to pH 7 with aqueous NaOH (8 percent), filtered to remove $Na_2SO_4$, and distilled in order to remove a mixture of acetaldehyde, acetone and water. The acetaldehyde content of the distillate was 10.9 g., i.e. 85 percent of the theoretical amount (12.8 g), calculated on hydroperoxide groups initially present. The ethylphenol content of the bottom fraction was 29.1 g (55 percent of the mixture). The molar yield in ethylphenol calculated on DEBOOH was 92 percent and molar yield calculated on converted diethylbenzene was 72 percent.

The ethylphenol may be obtained in a pure form either by (1) direct fractional distillation at 40 mm Hg which gives a top fraction of diethylbenzene and a heart cut of about 98 percent m-ethylphenol (Bp 127°) or (2) an alkaline extraction with 10 percent aqueous NaOH (5 percent excess) followed by a washing of the extract with heptane, the regeneration of the phenols with 16 N $H_2SO_4$ and distillation of more than 99 percent pure product. The final yield of m-ethylphenol on converted diethylbenzene was about 69 percent in mole or 63 percent in weight.

What is claimed is:

1. A process for producing ethylphenols which comprises (1) the oxidation of diethylbenzene by passing a molecular oxygen containing gas into contact with said diethylbenzene at a temperature between 125° and 160°C. to convert 5 to 30 percent of said diethylbenzene into diethylbenzene mono-hydroperoxide, (2) withdrawing the reaction mixture, separating the unconverted diethylbenzene therefrom to obtain a mono-hydroperoxide concentrate containing at least 40 percent of diethylbenzene mono-hydroperoxide, (3) mixing the diethylbenzene mono-hydroperoxide concentrate with a solvent selected from the group consisting of lower alkanols, lower alkanones and mixtures thereof, (4) decomposing said mono-hydroperoxide by intimately contacting said mixture of diethylbenzene mono-hydroperoxide and solvent with between 0.05 and 5 percent by weight of total reaction mixture of a strong acid, which does not interfere with the reaction, in concentrated form at a temperature between about 55° and 75°C., and neutralizing the resulting mixture, and (5) distilling the neutralized mixture to recover a bottom fraction containing ethylphenol and a top fraction containing acetaldehyde.

2. The process of claim 1 wherein said oxidation of diethylbenzene is carried out by starting the reaction at about 150°C and then progressively decreasing the temperature down to about 140°C.

3. The process of claim 1 wherein the amount of oxygen in the vent gas issuing from said oxidation of diethylbenzene is maintained below 20 percent by volume.

4. The process of claim 1 wherein said oxidation of diethylbenzene is carried out in the presence of 0 to 5 percent by weight based on diethylbenzene, of an initiator from the group consisting of peroxycompounds and diazo compounds.

5. The process of claim 4 wherein said initiator is selected from the group consisting of perbenzoates, tert-butylperoxide, diethylbenzene hydroperoxides and azobiscyclohexanenitrile.

6. The process of claim 4 wherein said oxidation of diethylbenzene is carried out in the presence of a basic compound selected from the group consisting of the carbonates of alkaline and alkaline earth metals, oxides of alkaline earth metals, alkaline soaps, pyridine and mixtures thereof, in an amount corresponding to 0.1 to 5 percent by weight of the diethylbenzene.

7. The process of claim 1 wherein said diethylbenzene hydroperoxide is decomposed by intimate contact with a strong acid selected from the group consisting of sulphuric acid, phosphoric acid, sulfonic acids, Lewis acids and acid ion-exchange resins.

8. The process of claim 1 wherein the diethylbenzene is meta-diethylbenzene.

9. The process of claim 1, wherein said solvent is acetone, methanol or mixture thereof.

10. The process of claim 9, wherein said solvent is anhydrous acetone.

11. The process of claim 1, wherein the volumn ratio of solvent to mono-hydroperoxide is between about 4:1 and 0.8:1.

12. The process of claim 8, wherein the amount of oxygen in the vent gas issuing from said oxidation step is less than 10 percent by volume.

13. The process of claim 1, wherein said conversion of diethylbenzene in step (1) is between about 10 and 25 percent.

14. The process of claim 1, wherein said diethylbenzene is meta-diethylbenzene, said temperature in step (1) is between about 140° and 150°C., said solvent is acetone, and said strong acid is sulfuric acid.

* * * * *